United States Patent [19]

Henn

[11] Patent Number: 5,671,947
[45] Date of Patent: Sep. 30, 1997

[54] CONVERTIBLE PASSENGER CAR

[75] Inventor: Uwe Henn, Wimsheim, Germany

[73] Assignee: Dr. Ing. h.c.F. Porsche, Weissach, Germany

[21] Appl. No.: 589,603

[22] Filed: Jan. 22, 1996

[30] Foreign Application Priority Data

Jan. 20, 1995 [DE] Germany ............... 195 01 584.3

[51] Int. Cl.⁶ .......................... B60R 21/13; B60R 21/00
[52] U.S. Cl. ........................................... 280/756; 296/203
[58] Field of Search ............................ 280/756; 296/203

[56] References Cited

U.S. PATENT DOCUMENTS

| 5,018,780 | 5/1991 | Yoshii et al. ............ 296/203 |
| 5,066,040 | 11/1991 | Dangl et al. ............ 280/756 |

FOREIGN PATENT DOCUMENTS

| 0407741A2 | 1/1991 | European Pat. Off. . |
| 0623492A1 | 11/1994 | European Pat. Off. . |
| 39 25513C2 | 2/1991 | Germany . |
| 4100506C1 | 5/1992 | Germany . |
| 43 14538A1 | 11/1994 | Germany . |

*Primary Examiner*—Kenneth R. Rice
*Attorney, Agent, or Firm*—Evenson McKeown Edwards & Lenahan, PLLC

[57] ABSTRACT

A motor vehicle, particularly a convertible, has a folding top and a rollover protection device which is arranged behind the seats and which comprises at least one prefabricated cassette. The cassette contains a protective bow and an actuator, and a rollover sensor, the prefabricated cassette being fixable on a receiving device. For reducing the mounting time on the vehicle belt as well as for making it possible to test the rollover protection device outside the vehicle, it is provided that the receiving device and at least the components of the rollover protection device are combined to form a precabled operative module which is produced outside the vehicle.

40 Claims, 3 Drawing Sheets

CONVERTIBLE PASSENGER CAR

BACKGROUND AND SUMMARY OF THE INVENTION

This invention relates to a motor vehicle, having a folding top and a rollover protection device arranged behind the seats which comprises at least one prefabricated cassette containing a protective bow and an actuator, and a rollover sensor, the cassette being fixable on a receiving device.

In the case of a known motor vehicle of the initially mentioned type (new 3-series convertible by BMW, internal model E 36), box-shaped receiving devices for the two prefabricated cassettes are provided which are integrated behind the rear seats in the vehicle body, the receiving devices being formed by a stationary, transversely extending partition and housing-type closing parts connected with this partition. On the side of the partition facing the passenger compartment, the two closing parts are fitted on both sides of a loading opening onto the partition and connected with it.

The prefabricated cassettes, which each contain a protective bow, which can be moved out, and an actuator, are inserted from above into the receiving devices and are then fastened on the receiving devices in the vehicle. Subsequently, the rollover sensor is inserted through a frontal opening of the receiving device and is screwed to the housing of the cassette.

This arrangement has the disadvantage that the function of the rollover protection device can be tested only after a complete installation into the vehicle and not outside the vehicle. In addition, cost-intensive sheet metal stamping tools are required for manufacturing the receiving device and the mounting of the rollover protection device on the vehicle belt is time-intensive.

It is an object of the invention to design a receiving device for a rollover protection device containing at least one prefabricated cassette in such a manner that, while the manufacturing is reasonable with respect to cost, a testing of the function of the rollover protection device can take place outside the vehicle and, at the same time, the mounting time on the vehicle is significantly reduced.

According to the invention, this object is achieved by providing a convertible motor vehicle having a folding top and a rollover protection device arranged behind the seats which comprises at least one prefabricated cassette containing a protective bow and an actuator, and a rollover sensor, the prefabricated cassette being fixable on a receiving device, wherein the receiving device and at least the components of the rollover protection device are combined to form a precabled, operative module which is produced outside the vehicle.

Principal advantages achieved by means of the invention are that, as a result of the combination of the receiving device and the components of the rollover protection system for forming a precabled and operative module produced outside the vehicle, on the one hand, a performance test of the rollover device before the installation on the vehicle is ensured and that, on the other hand, the mounting time for the receiving device and the rollover protection system on the vehicle is shortened significantly. The receiving device is formed by a form-rigid supporting frame which is composed of hollow profiles and which is reasonable in cost because of the use of extruded profile parts made of a light metal alloy and has a low weight. The supporting frame is preferably connected to a supporting structure of the body situated underneath it and causes a significant stiffening of the rear carriage and a significant increase of the torsional rigidity.

Preferably additional assemblies are integrated into the prefabricated module, such as control units for the motor knock control (MOTRONIC) and/or the transmission control (TIPTRONIC) and/or the folding top. In addition, components of the central electric system and of the folding top drive may be mounted on the supporting frame of the module, which further reduces the mounting time.

Also, a transversely extending panelling is preferably arranged above the supporting frame and is fixedly connected with the supporting frame which facilitates the mounting.

Stops provided on the supporting frame in certain preferred embodiments are used as the support for the deposited folding top.

Other objects, advantages and novel features of the present invention will become apparent from the following detailed description of the invention when considered in conjunction with the accompanying drawings.

DETAILED DESCRIPTION OF THE DRAWINGS

Figure 1:
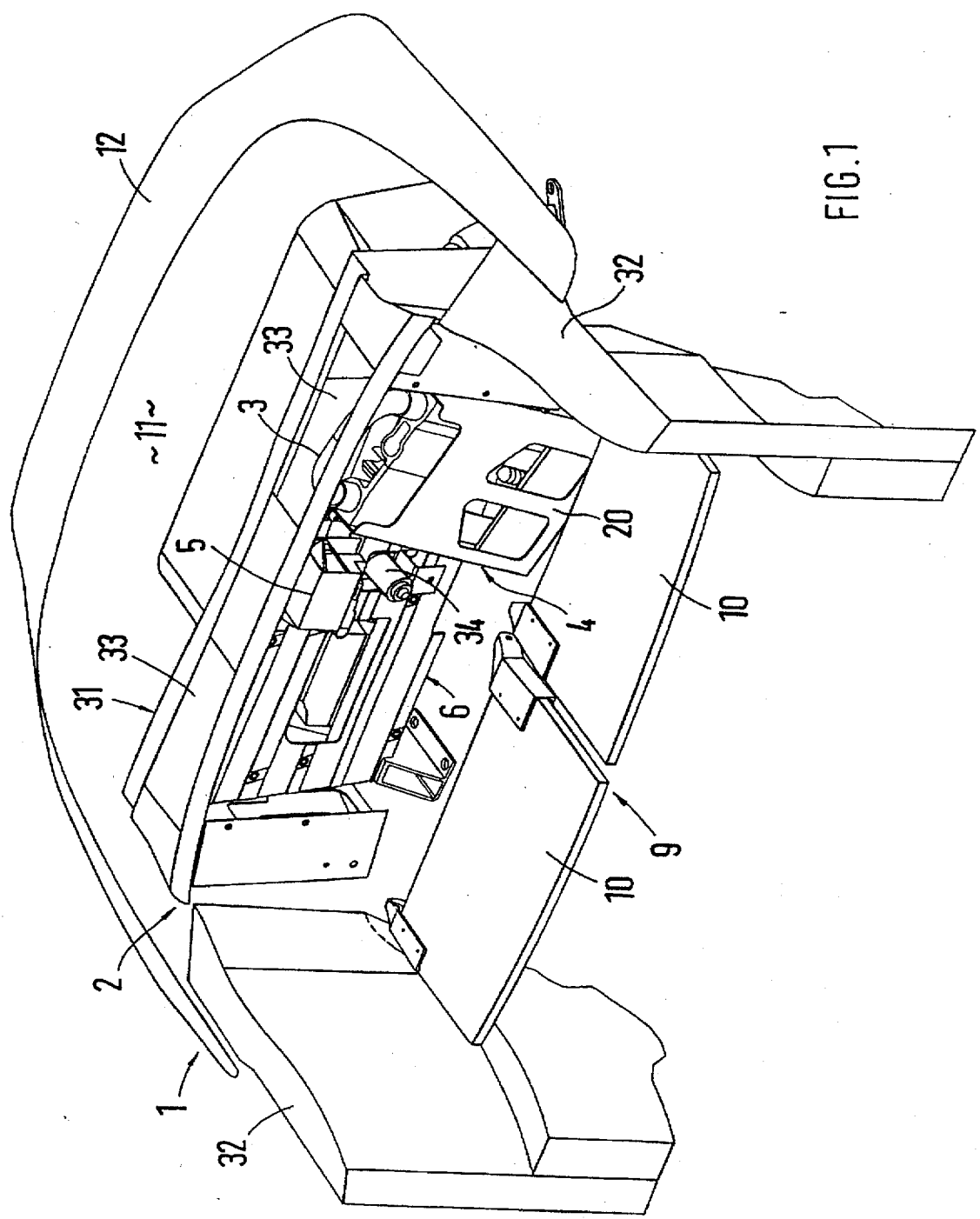
FIG. 1 is a perspective view diagonally from the front of a rear-side area of the passenger compartment and an adjoining rear area of a motor vehicle with a prefabricated module constructed according to a preferred embodiment of the present invention.

FIG. 1 illustrates a partial area of a motor vehicle formed as a convertible, in which case the two-door convertible has a folding top which is not shown in detail and a rollover protection device 2 arranged behind the seats. The rollover protection device 2 comprises at least one prefabricated cassette containing a protective bow 3 which can be moved out, an actuator for actuating movement of the protective bow, and a rollover sensor for detecting rollover conditions and initiating the actuator. The cassette 4 can be fixed on a receiving device 6.

According to the invention, the receiving device 6 and at least the components of the rollover protection device 2 are combined to form a precabled, operative module 7 produced outside the vehicle.

The receiving device 6 is formed by a transversely extending supporting frame 8 which is arranged behind the rear seats 9 of the motor vehicle 1 and is held in position on the body situated underneath it.

The two rear seats 9 have foldable backrests 10 which, according to FIG. 1, take up a folded-down horizontal position.

The supporting frame 8, which extends along a significant portion of the width of the vehicle interior separates the passenger compartment from the rear-side receiving space 11 for the folding top situated behind the passenger compartment. The receiving space 11 is at least in sections covered in the upward direction by the folding top compartment lid 12.

The supporting frame 8 is composed of a transversely extending hollow profile 13, two laterally exterior, upright column sections 14 and two rear-side supporting elements 15. On its lower edge, the transversely extending hollow profile 13 is carried by two holding blocks 16 which are fastened to a side rail of the body which is located underneath the holding blocks and is not shown in detail. The fastening takes place by screwing, welding or the like.

For reasons of weight, the transversely extending hollow profile 13 is locally provided with at least one recess 17.

In the embodiment shown, the individual components 13, 14, 15, 16 of the supporting frame 8 are formed of extruded profile parts made of a light-metal alloy which can be produced at reasonable cost and are connected with one another.

The supporting elements 15, which extend from the upper laterally exterior edge 18 of the hollow profile 13 toward the rear and downward, are formed, for example, by bent tubes. In the rearward, lower end area of the supporting elements 15, a mounting plate 19 is mounted which is fastened to the body situated underneath it by means of screws or the like. Viewed along their longitudinal course, the tubes may have a different cross-section. This different cross-section along the tubes is achieved, for example, by a local hydraulic expanding (internal high-pressure method).

The supporting frame 8 provides the vehicle body with a considerably increased torsional rigidity, particularly in the rear area.

In the embodiment shown, two prefabricated, operative cassettes 4 of the rollover protection device 2 as well as a rollover sensor 5 are fastened on the transversely extending hollow profile 13 (only one cassette is shown). The two cassettes 4 are each mounted in a diagonal manner on the supporting frame 8 such that the upper end facing the longitudinal center plane of the vehicle is situated higher than the laterally exterior upper end of the cassette 4.

Each cassette 4 comprises essentially one protective bow 3 which can be moved out and is disposed in a housing 20.

In addition, an actuator, which is not shown in detail, is integrated into each cassette 4 and comprises a simple-action solenoid which directly activates the triggering lever.

As a result of the mounting of the prefabricated operative components of the rollover device 2 and their precabling, it is achieved that the rollover protection device 2 can already be tested outside the vehicle; that is, it can be tested under which conditions the rollover protection device 2 is triggered.

Furthermore, additional assemblies may be fastened on the supporting frame 8 and are therefore premounted outside the vehicle.

In the embodiment shown, control units 21, 22, 23 for the Motronic (electronic engine knock control system), the Tiptronic (electronic transmission shift control unit), the folding top, components of the central electric system 24 as well as hydraulic and/or electric assemblies of the folding top drive are fixed on the supporting frame 8. The laterally exterior, upright column sections 14 receive one seat belt retractor 26 respectively of a seat belt system 27 within their hollow space 29, specifically in a lower end area. The seat belt 28 is guided upwards within the hollow space 29 and is deflected by way of a fitted-on deflection element 30.

In addition, the supporting frame 8 carries a transversely extending, approximately horizontally aligned panelling 31 which is situated above and which is laterally adjacent to the two rear-side panellings 32. The panelling 31 has cover sections 33 which are inserted in the area of the protective bow 3 which is located underneath and can be moved out, which cover sections 33 are moved upwards when the protective bow 3 is moved out.

Also, stops are mounted locally on the supporting frame 8 on which stops a form-rigid frontal folding top section of the folding top is supported in its folded-back position.

As a result of the prefabricated module 7, a premounting takes place which is independent of the remaining vehicle frame and it is possible to test the rollover device 2 outside the vehicle.

By means of mounting the supporting frame 8 with the rollover protection device 2 on a test table which can be swivelled about a longitudinal and transverse axis, it can be tested whether, in the case of the desired angles of rotation, the rollover sensor 5 activates the protective bow 3.

Figure 2:
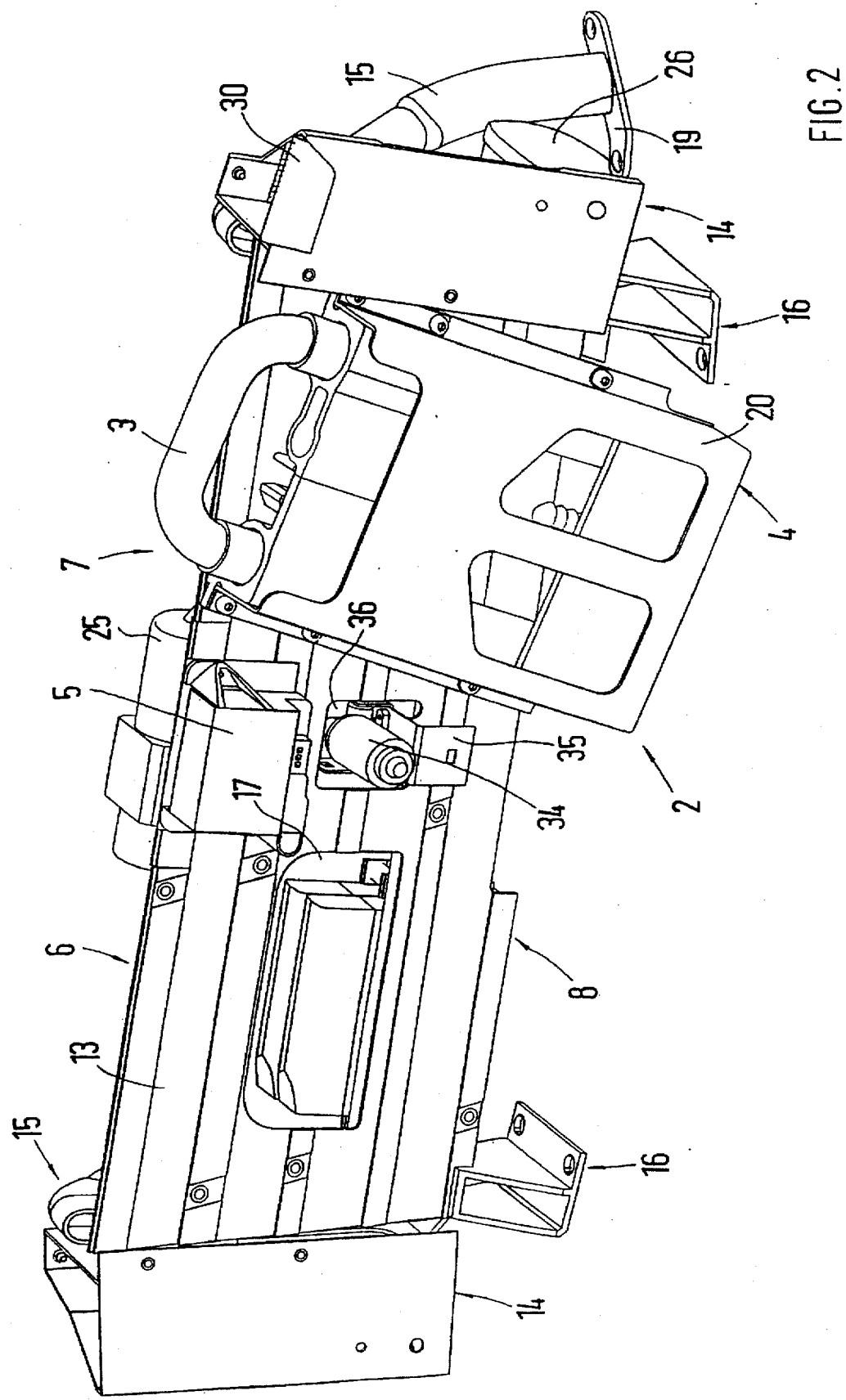
FIG. 2 is a further view diagonally from the front of the prefabricated module.
Figure 3:
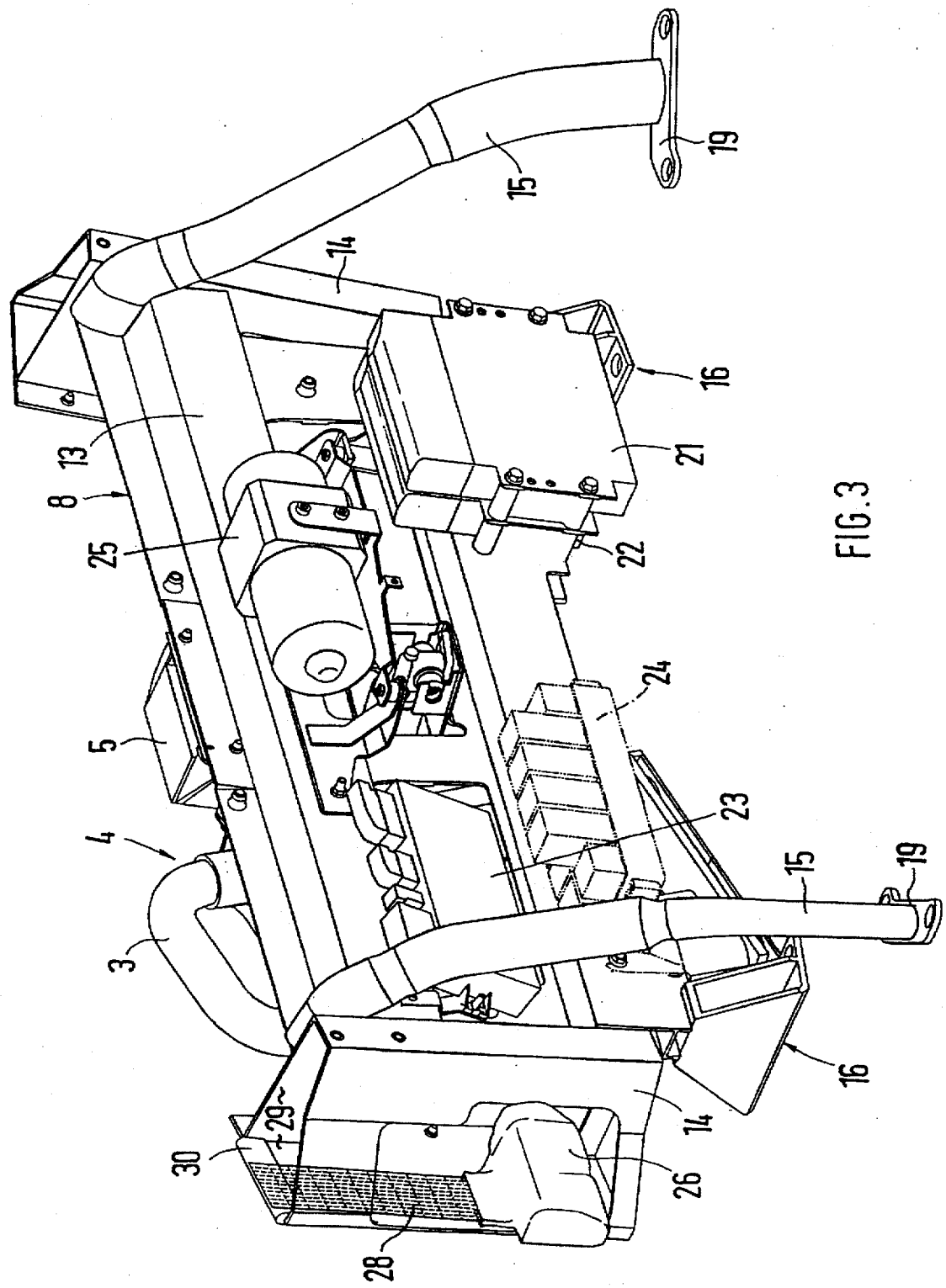
FIG. 3 is a view diagonally from the rear of the prefabricated module.

In addition, FIGS. 1 and 2 also illustrate a motor 34 for the folding-top compartment lid drive. This drive is arranged in the area of a recess 36 by means of a holder 35.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A convertible motor vehicle, having a folding top and a rollover protection device arranged behind the seats which comprises at least one prefabricated cassette containing a protective bow and an actuator, and a rollover sensor, the prefabricated cassette being fixable on a receiving device, wherein the receiving device and at least the components of the rollover protection device are combined to form a precabled, operative module which is produced outside the vehicle, wherein the receiving device is formed by a separate supporting frame which extends in a transverse direction of the vehicle and which can be fixed on the adjoining vehicle body, the supporting frame extending along a significant portion of the interior width of the vehicle, wherein the supporting frame is essentially composed of:
a large-surface, transversely extending hollow profile, two laterally exterior upright column sections, and two rear-side supporting elements, and wherein the upright column sections are fixedly connected on both sides to the transversely extending hollow profile, the column sections being constructed to be open toward the top and the bottom.

2. Motor vehicle according to claim 1, wherein the transversely extending hollow profile is carried by spaced holding blocks, the holding blocks being fixable on the vehicle body situated underneath.

3. Motor vehicle according to claim 1, comprising additional assemblies mounted on the prefabricated module.

4. Motor vehicle according to claim 3, wherein said additional assemblies include individual components of a seat belt system integrated in the prefabricated module.

5. Motor vehicle according to claim 4, wherein belt retractors of the seat belt system are mounted inside a hollow space of the upright column sections, and wherein a deflection element for the belt guided to the belt retractor is provided on an upper edge of each upright column section.

6. Motor vehicle according to claim 1, wherein individual parts of the supporting frame are formed by extruded profile parts made of a light metal alloy.

7. Motor vehicle according to claim 1, wherein the transversely extending hollow profile is carried by spaced holding blocks, the holding blocks being fixable on the vehicle body situated underneath.

8. Motor vehicle according to claim 7, wherein the two cassettes of the rollover protection device are diagonally mounted on the transversely extending hollow profile of the supporting frame in such a manner that upper edges of the cassettes facing a longitudinal center plane of the vehicle are situated higher than upper exterior edges of the cassettes.

9. Motor vehicle according to claim 8, comprising additional assemblies mounted on the prefabricated module.

10. Motor vehicle according to claim 9, wherein said additional assemblies include at least one of a Motonic engine knock control unit, a Tiptronic transmission control unit, and a folding top control unit are mounted on the prefabricated module.

11. A convertible motor vehicle, having a folding top and a rollover protection device arranged behind the seats which comprises at least one prefabricated cassette containing a protective bow and an actuator, and a rollover sensor, the prefabricated cassette being fixable on a receiving device, wherein the receiving device and at least the components of the rollover protection device are combined to form a precabled, operative module which is produced outside the vehicle,
 wherein the receiving device is formed by a separate supporting frame which extends in a transverse direction of the vehicle and which can be fixed on the adjoining vehicle body, the supporting frame extending along a significant portion of the interior width of the vehicle,
 wherein the supporting frame is essentially composed of: a large-surface, transversely extending hollow profile, two laterally exterior upright column sections, and two rear-side supporting elements, and
 wherein the two cassettes of the rollover protection device are diagonally mounted on the transversely extending hollow profile of the supporting frame in such a manner that upper edges of the cassettes facing a longitudinal center plane of the vehicle are situated higher than upper exterior edges of the cassettes.

12. A convertible motor vehicle, having a folding top and a rollover protection device arranged behind the seats which comprises at least one prefabricated cassette containing a protective bow and an actuator, and a rollover sensor, the prefabricated cassette being fixable on a receiving device, wherein the receiving device and at least the components of the rollover protection device are combined to form a precabled, operative module which is produced outside the vehicle,
 comprising additional assemblies mounted on the prefabricated module, and
 wherein said additional assemblies include drive assemblies of the folding top drive held in position on the prefabricated module.

13. A convertible motor vehicle, having a folding top and a rollover protection device arranged behind the seats which comprises at least one prefabricated cassette containing a protective bow and an actuator, and a rollover sensor, the prefabricated cassette being fixable on a receiving device, wherein the receiving device and at least the components of the rollover protection device are combined to form a precabled, operative module which is produced outside the vehicle,
 comprising additional assemblies mounted on the prefabricated module, and
 wherein said additional assemblies include individual components of a seat belt system integrated in the prefabricated module.

14. A convertible motor vehicle, having a folding top and a rollover protection device arranged behind the seats which comprises at least one prefabricated cassette containing a protective bow and an actuator, and a rollover sensor, the prefabricated cassette being fixable on a receiving device, wherein the receiving device and at least the components of the rollover protection device are combined to form a precabled, operative module which is produced outside the vehicle,
 wherein the receiving device is formed by a separate supporting frame which extends in a transverse direction of the vehicle and which can be fixed on the adjoining vehicle body, the supporting frame extending along a significant portion of the interior width of the vehicle, and
 wherein a transversely extending, approximately horizontally aligned panelling is provided above the supporting frame, which panelling forms a transverse connection to longitudinally extending rear side panellings and which, in sections, is supported on the supporting frame situated underneath the horizontally aligned panelling.

15. A convertible motor vehicle, having a folding top and a rollover protection device arranged behind the seats which comprises at least one prefabricated cassette containing a protective bow and an actuator, and a rollover sensor, the prefabricated cassette being fixable on a receiving device, wherein the receiving device and at least the components of the rollover protection device are combined to form a precabled, operative module which is produced outside the vehicle,
 wherein the receiving device is formed by a separate supporting frame which extends in a transverse direction of the vehicle and which can be fixed on the adjoining vehicle body, the supporting frame extending along a significant portion of the interior width of the vehicle, and
 wherein stops are provided locally on the supporting frame, a forward, form-rigid folding-top section of the folded-back folding top resting on these stops in its deposited position.

16. A method of making a convertible motor vehicle of the type having a folding top and a rollover protection device arranged behind the seats which comprises at least one prefabricated cassette containing a protective bow and an actuator, and a rollover sensor, the prefabricated cassette being fixable on a receiving device, said method comprising:
 producing a precabled, operative module outside of said vehicle, said module including said receiving device and components of the rollover protection device including electrical wiring and control units sufficient to be operable to selectively actuate movement of the protective bow to a rollover protection position,
 testing said rollover protection device by mounting said module on a tiltable rollover testing table unit,
 and subsequently attaching said module onto fixed vehicle frame structure of the vehicle.

17. A rollover protection assembly for a convertible vehicle comprising:
 a support frame forming a receiving device, and
 a cassette mounted in said receiving device and containing a protective rollover bar,
 a rollover sensor, and
 an actuator responsive to the rollover sensor to actuate movement of the rollover bar to a rollover protective position, wherein said support frame, cassette, rollover sensor and actuator are combined with electrical cabling to form a prewired functional module which can be operably tested separate from a vehicle and be subsequently fixed to the vehicle support structure.

18. A rollover protection assembly according to claim 17, wherein two of said cassettes are mounted in said receiving device of the support frame, said support frame extending transversely over a significant portion of an interior width of a vehicle when in an installed position.

19. A rollover protection assembly according to claim 18, wherein the supported frame comprises:

a large-surface, transversely extending hollow profile, two laterally exterior upright column sections, and two rear-side supporting elements.

20. A rollover protection assembly according to claim 18, wherein the upright column sections are fixedly connected on both sides to the transversely extending hollow profile, the column sections being constructed to be open toward the top and the bottom.

21. A rollover protection assembly according to claim 18, wherein the two cassettes of the rollover protection device are diagonally mounted on the transversely extending hollow profile of the supporting frame in such a manner that upper edges of the cassettes facing a longitudinal center plane of the vehicle are situated higher than upper exterior edges of the cassettes.

22. A rollover protection assembly according to claim 18, comprising additional operating assemblies mounted on the prewired functional module.

23. A rollover protection assembly according to claim 22, wherein belt retractors of the seat belt system are mounted inside a hollow space of the upright column sections, and wherein a deflection element for the belt guided to the belt retractor is provided on an upper edge of each upright column section.

24. A rollover protection assembly according to claim 23, wherein said additional assemblies include components of a central electronic system of a motor vehicle.

25. A rollover protection assembly according to claim 18, wherein belt retractors of the seat belt system are mounted inside a hollow space of the upright column sections, and wherein a deflection element for the belt guided to the belt retractor is provided on an upper edge of each upright column section.

26. A rollover protection assembly according to claim 18, wherein transversely extending, approximately horizontally aligned panelling is provided above the supporting frame, which panelling forms a transverse connection to longitudinally extending rear side panellings and which, in sections, is supported on the supporting frame situated underneath the horizontally aligned panelling.

27. A rollover protection assembly according to claim 26, wherein said additional assemblies include individual components of a seat belt system integrated in the prefabricated module.

28. A rollover protection assembly according to claim 18, wherein stops are provided locally on the supporting frame, a forward, form-rigid folding-top section of the folded-back folding top resting on these stops in its deposited position.

29. A rollover protection assembly according to claim 18, wherein individual parts of the supporting frame are formed by extruded profile parts made of a light metal alloy.

30. A rollover protection assembly according to claim 17, wherein the supported frame comprises:

a large-surface, transversely extending hollow profile, two laterally exterior upright column sections, and two rear-side supporting elements.

31. A rollover protection assembly according to claim 30, wherein the upright column sections are fixedly connected on both sides to the transversely extending hollow profile, the column sections being constructed to be open toward the top and the bottom.

32. A rollover protection assembly according to claim 30, wherein the transversely extending hollow profile is carried by spaced holding blocks, the holding blocks being fixable on a vehicle body situated underneath.

33. A rollover protection assembly according to claim 17, comprising additional operating assemblies mounted on the prewired functional module.

34. A rollover protection assembly according to claim 33, wherein the additional assemblies include an electronic control unit for an engine ignition knock control system.

35. A rollover protection assembly according to claim 34, wherein the additional assemblies include an electronic control unit for a vehicle transmission.

36. A rollover protection assembly according to claim 35, comprising additional operating assemblies mounted on the prewired functional module.

37. A rollover protection assembly according to claim 33, wherein the additional assemblies include an electronic control unit for a vehicle transmission.

38. A rollover protection assembly according to claim 33, wherein the additional assemblies include components of a central electronic system of a motor vehicle.

39. A rollover protection assembly according to claim 33, wherein the additional assemblies include drive assemblies of the folding top drive held in position on the prefabricated module.

40. A rollover protection assembly according to claim 33, wherein the additional assemblies include individual components of a seat belt system integrated in the prefabricated module.

* * * * *